United States Patent

[11] 3,634,091

[72] Inventors: Hansrolf Loeffel, Bern; John Lenoir; Bernhard Piller, both of Marly-le-Petit, all of Switzerland
[21] Appl. No.: 28,544
[22] Filed: Apr. 14, 1970
[45] Patented: Jan. 11, 1972
[73] Assignee: Ciba Limited, Basel, Switzerland
[32] Priority: Apr. 18, 1969
[33] Switzerland
[31] 5897/69

[54] PHOTOGRAPHIC LIGHT-SENSITIVE MATERIAL
16 Claims, No Drawings

[52] U.S. Cl........... 96/99, 96/73, 96/53, 96/20
[51] Int. Cl........... G03c 1/10, G03c 1/76
[50] Field of Search........... 96/99, 73, 53, 20

[56] References Cited
UNITED STATES PATENTS
3,119,811  1/1964  Dreyfuss........... 96/99
3,157,508  11/1964  Dreyfuss........... 96/99

Primary Examiner—Norman G. Torchin
Assistant Examiner—Edward C. Kimlin
Attorneys—Harry Goldsmith, Joseph G. Kolodny and Mario A. Monaco ABSTRACT: Photographic light-sensitive material especially for the silver dyestuff bleaching process is provided. This material contains on a support at least one layer having at least one cyan dyestuff of the formula

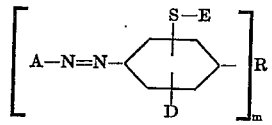

in which A is a hydroxynaphthalene radical which may be substituted by an amino or hydroxyl group and which contains at least one sulfonic acid or sulfonic acid amide group, the hydroxyl group being in the ortho position to the azo group, D is hydrogen, halogen, alkyl, alkoxy, hydroxyalkoxy or acylamino and R is an organic radical bound to the benzene radical through an —NH— or —N N— bridge, $m$ is at most 3 and the dyestuff contains at least two sulfonic acid groups per molecule. These dyestuffs are diffusion resistant and form stable aqueous solutions, are insensitive to calcium ions and can be bleached white.

PHOTOGRAPHIC LIGHT-SENSITIVE MATERIAL

This invention provides photographic light-sensitive material especially for the silver dye bleaching process that contains on a support at least one layer having at least one dyestuff of the formula (1)
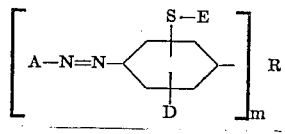

wherein A denotes a hydroxynaphthalene radical which may be substituted by an amino or hydroxyl group which may be further substituted, and which contains at least one sulphonic acid or sulphonic acid amide group, the hydroxyl group being in the ortho-position to the azo group, D denotes a hydrogen or halogen atom, a lower alkyl, lower alkoxy or lower hydroxyalkoxy group or an acylamino group, E denotes a lower alkyl, hydroxyalkyl or carboxyalkyl group, R denotes an organic radical which is bound to the benzene radical through an —NH— or —N═N— bridge, and $m$ denotes an integer having a value of at most 3, the dyestuff containing at least two sulphonic acid groups per molecule.

Preference is given to photographic material which contains at least one dyestuff of the formula (2)
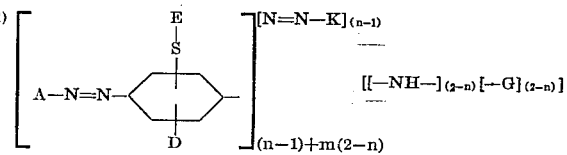

wherein K denotes an aromatic or heterocyclic radical having at most 3 ring members, G denotes an acyl radical bound to $m$ —NH— groups through $m$ acyl groups, and $n=1$ or 2, and A, D, E and $m$ have the significance indicated, the dyestuff containing at least two sulphonic acid groups per molecule.

The radical K in the formula (2) can be substituted in the most diverse ways, for example by halogen atoms, hydroxyl, amino, carboxylic acid, carboxylic acid amide, sulphonic acid, sulphonic acid amide, urea or nitro groups. Further radicals for example alkyl, cycloalkyl, aralkyl or aryl radicals or heterocyclic radicals may also be bound to the radical K directly or through bridge members.

Suitable bridge members are for example those of the formulae

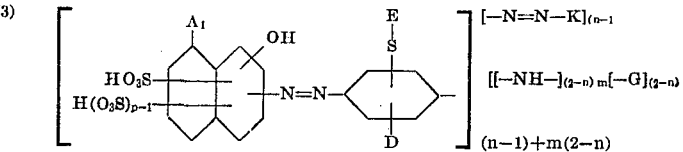

It is advantageous to use dyestuffs of the formula (3)
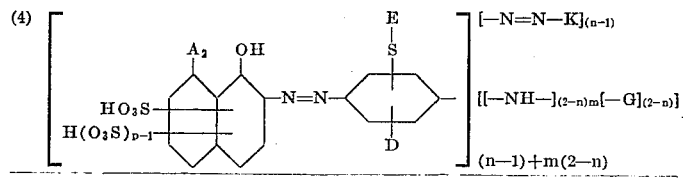

wherein $A_1$ denotes a hydrogen atom or an amino or hydroxyl group which may be further substituted, $p=1$ or 2, and E, D, G, K, $m$ and $n$ have the significance indicated, the hydroxyl group being in the 1- or 2-position and $A_1$ being in the 8-position of the naphthalene radical, the azo group being in the ortho-position to the hydroxyl group, and the dyestuff containing at least two sulphonic acid groups per molecule.

Good results are particularly obtained with dyestuffs of the formula (4)
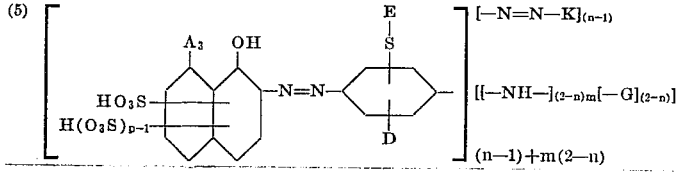

wherein $A_2$ denotes an amino group which may be substituted by lower alkyl, aryl, cycloalkyl or acyl groups or a hydroxyl group which may be substituted by a lower alkyl, hydroxyalkyl or aralkyl group, and E, D, G, K, $m$, $n$ and $p$ have the significance indicated, the dyestuff containing at least two sulphonic acid groups per molecule. The lower alkyl groups preferably contain at most five carbon atoms.

Of special interest are dyestuffs of the formula (5)
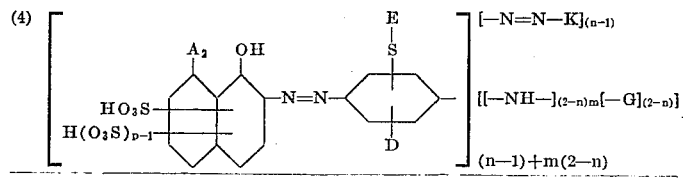

wherein $A_3$ denotes a radical of the formula

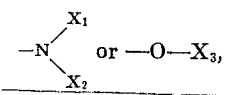

in which $X_1$ represents a hydrogen atom, or a methyl or ethyl group, $X_2$ represents a hydrogen atom or a methyl, ethyl or cyclohexyl group, a phenyl group which may be further substituted or an acyl group, the acyl group being derived from an organic mono- or poly-carboxylic or -sulphonic acid or from an N-heterocyclic compound containing hydroxyl groups, $X_3$ represents a hydrogen atom or a methyl, ethyl, hydroxyethyl or benzyl group, and E, D, G, K, $m$, $n$ and $p$ have the significance indicated, the dyestuff containing at least two sulphonic acid groups per molecule.

Here dyestuffs of the formula (6) 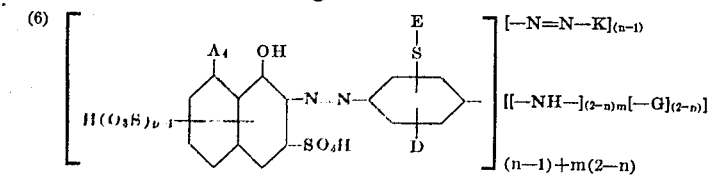

are particularly advantageous, wherein $A_4$ denotes a radical of the formula

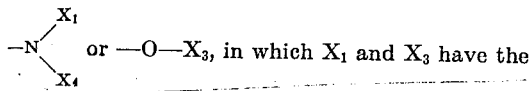

or $-O-X_3$, in which $X_1$ and $X_3$ have the significance indicated, and $X_4$ denotes a hydrogen atom, a methyl, ethyl or cyclohexyl group, a phenyl group which may be further substituted, or an acyl group, the acyl group being derived from an aliphatic, cycloaliphatic or araliphatic monocarboxylic or dicarboxylic acid having at most 10 carbon atoms, or from an aromatic mono- or di-carboxylic or sulphonic acid, or from a heterocyclic monocarboxylic or dicarboxylic acid or from an N-heterocyclic compound containing hydroxyl groups and possessing acidic characteristics; E, D, G, K, $m$, $n$ and $p$ have the significance indicated, the dyestuff containing at least two sulphonic acid groups per molecule.

The aliphatic, cycloaliphatic or araliphatic monocarboxylic or dicarboxylic acids from which the acyl radical in the substituent $X_4$ is derived, can be further substituted. The aromatic carboxylic or sulphonic acids from which the acyl radical $X_4$ can be derived are as a rule preferably naphthalene or benzene carboxylic or sulphonic acids, which can in turn be substituted yet further by alkyl, perfluoralkyl, alkoxy, amino, acylamino, carboxyl, carboxylic acid amide, sulphonic acid, sulphonic acid amide, alkylsulphone, nitro, alkylcarbonyl or arylcarbonyl groups or halogen atoms. The alkyl radicals occurring in these substituents are preferably lower alkyl radicals having at most five carbon atoms. Acyl radicals which are derived from an N-heterocyclic compound containing hydroxyl groups and possessing acidic characteristics are primarily pyrimidyl radicals and above all 1,3,5-triazinyl radicals, which are preferably further substituted. Acyl radicals of heterocyclic carboxylic acids are for example derived from pyridine, furane or thiophene carboxylic acids.

Among the dyestuffs of formula (6), those of the formula (7) 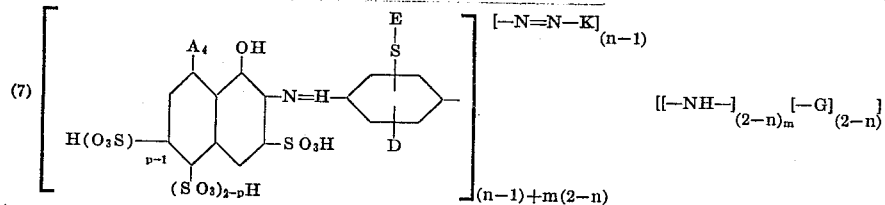

are preferred, wherein $A_4$, D, E, G, K, $m$, $n$ and $p$ have the significance indicated, the dyestuff containing at least two sulphonic acid groups per molecule.

Photographic material which contains at least one dyestuff of the formula (8) 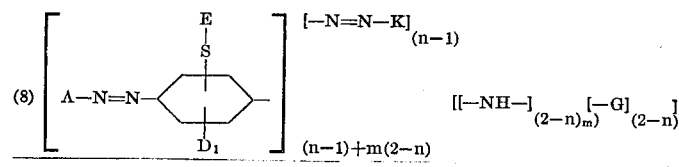

wherein $D_1$ denotes a hydrogen or chlorine atom or a methyl, methoxy, ethoxy, hydroxyethoxy or acetylamino group, and A, E, G, K, $m$ and $n$ have the significance indicated, the dyestuff containing at least two sulphonic acid groups per molecule, is preferred.

Here dyestuffs of the formula (9) 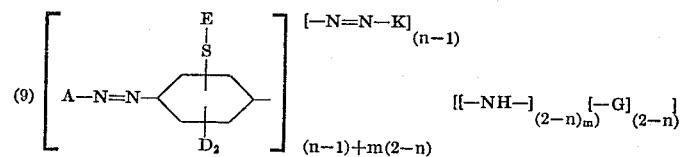

are of particular interest, wherein $D_2$ denotes a hydrogen atom or a methyl or methoxy group and A, E, G, K, $m$ and $n$ have the significance indicated, and in which at least two sulphonic acid groups are present per molecule.

Further dyestuffs which are suitable are particularly those of the formula

(10) 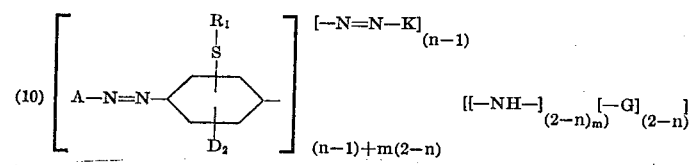

wherein $E_1$ represents a methyl, ethyl or hydroxyethyl radical and the radicals $D_2$ and $E_1$—S— are in the paraposition to one another, A, $D_2$, G, K, $m$ and $n$ have the significance indicated, and the dyestuff molecule contains at least two sulphonic acid groups.

Where $n=2$, in formula (2), the dyestuffs preferably correspond to the formula

(11) 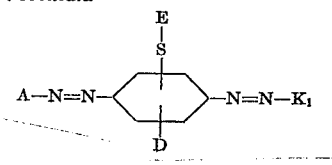

wherein $K_1$ denotes a benzene, naphthalene or pyrazolone radical which may be substituted, and A, E and D have the significance indicated, the dyestuff molecule containing at least two sulphonic acid groups.

Dyestuffs of the formula (12)

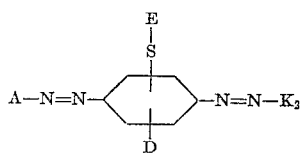

are here of particular interest, wherein $K_2$ denotes an acylaminobenzene radical which may be substituted by alkyl, alkoxy, carboxylic acid, sulphonic acid or nitro groups or chlorine atoms, the acyl group being derived from an aliphatic, heterocyclic or aromatic monocarboxylic or dicarboxylic acid, a naphthalene radical which may be substituted by hydroxyl, alkoxy, hydroxyalkoxy, aralkoxy, nitro, amino, alkylamino, cycloalkylamino, phenylamino, acylamino, carboxylic acid amide, carboxylic acid, sulphonic acid amide or sulphonic acid groups, or a pyrazolone radical of the formula (12a)

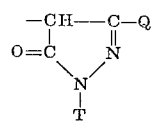

wherein T represents a benzene or naphthalene radical which may be substituted by alkyl, alkoxy, phenoxy, carboxylic acid, carboxylic acid amide, sulphonic acid, or sulphonic acid amide groups, amino or acylamino groups which may be further substituted, or halogen atoms, Q represents an alkyl, carboxylic acid, carboxylic acid alkyl ester, benzene, amino or acylamino radical, and A, D and E have the significance indicated, the dyestuff molecule containing at least two sulphonic acid groups.

Where the radical $K_2$ represents an acylaminobenzene radical, the acyl radical is derived from an aliphatic, heterocyclic or aromatic monocarboxylic or dicarboxylic acid. Thus $K_2$ may contain a simple acyl group, for example an acetyl radical, or an acyl group which still contains a free acid radical, for example a radical of the formula $-OC-CH=CH-COOH$. Furthermore, two radicals $K_2$ may be bound to one another by two amide functions through the diacyl radical. Monoacyl radicals are preferably derived from aliphatic carboxylic acids, for example acetic acid or propionic acid, or from benzene carboxylic acids which may be substituted. Suitable diacyl radicals are, for example, $-CO-$, glutaryl, fumaryl, terephthaloyl, isophthaloyl, thiophene-2,5-dicarbonyl, furane-2,5-dicarbonyl or pyridine-2,6-dicarbonyl radicals or also radicals of the formula (12b)   $-OC-C_6H_4-M-C_6H_4-CO-$ wherein M denotes $-O-$, $-S-$, $-SO_2-$, $-CH_2-$, $-CO-$ or $-NH-CO-NH-$.

Photographic material is also preferred which contains at least one dyestuff of the formula (13)

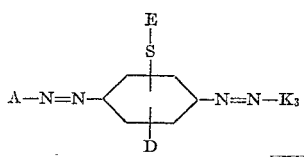

wherein $K_3$ denotes a naphthol radical which may be substituted by hydroxyl, alkoxy, hydroxyalkoxy, aralkoxy, amino, monoalkylamino or dialkylamino groups, the alkyl groups in each case containing at most five carbon atoms, cyclohexylamino, phenylamino, carboxylic acid, carboxylic acid amide, sulphonic acid, sulphonic acid amide or acylamino groups, the acyl radicals being derived from aliphatic or aromatic mono- or poly-carboxylic or -sulphonic acids, and A, D and E have the significance indicated, the dyestuff containing at least two sulphonic acid groups per molecule.

The amine radicals in the carboxylic acid amide radicals of the substituent $K_3$ are preferably derived from aromatic amines, especially from anilines which may be further substituted. The amine radicals in the sulphonic acid amide radicals of the substituent $K_3$ are preferably derived from lower monoalkylamines or dialkylamines, lower hydroxyalkylamines, anilines which may be substituted, N-alkylanilines or secondary heterocyclic amines. The lower alkyl radicals preferably contain at most five carbon atoms.

Very suitable dyestuffs of formula (13) correspond to the formula (14)

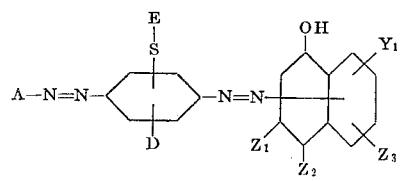

or (15)

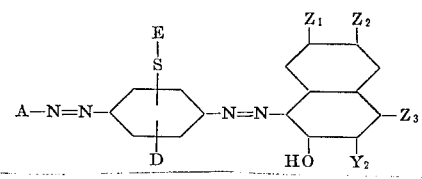

wherein $Z_1$, $Z_2$ and $Z_3$ each represents a hydrogen atom or a sulphonic acid or sulphonic acid amide group, $Y_1$ represents a hydrogen atom or a hydroxyl, alkoxy, hydroxyalkoxy, aralkoxy or alkylamino group, the alkyl radical in each case containing at most five carbon atoms, or an amino, cyclohexylamino, phenylamino or acylamino group, the acyl radical having the above mentioned significance, $Y_2$ represents a hydrogen atom or a carboxylic acid or carboxylic acid amide group and A, D and E have the significance indicated, each dyestuff molecule containing at least two sulphonic acid groups and the right-hand side azo group in formula (14) being in the 2-, 5- or 8-position of the 1-naphthol radical.

When $n=1$, in formula (2), the dyestuffs preferably correspond to the formula (16)

$[A-N=N-\langle \rangle -NH-]_m[-G_1]$ wherein $G_1$ denotes an acyl radical, bound through $m$ acyl groups to $m$ $-NH-$ groups, of a substituted or unsubstituted aliphatic monocarboxylic or dicarboxylic acid or monosulphonic acid, a substituted or unsubstituted aromatic mono- or di-carboxylic or -sulphonic acid, a heterocyclic monocarboxylic or dicarboxylic acid or a substituted or unsubstituted N-heterocyclic compound containing hydroxyl groups and possessing acid characteristics, and A, D, E and $m$ have the significance indicated, the dyestuff molecule containing at least two sulphonic acid groups.

The aromatic acyl radicals of the substituents $G_1$ are preferably derived from benzene monocarboxylic or dicarboxylic acids. The aliphatic acyl radicals radicals preferably contain at most 12 carbon atoms.

The acyl radicals of the N-heterocyclic compounds containing hydroxyl groups and possessing acid characteristics are preferably derived from heterocyclic compounds which possess six ring members and contain up to three ring nitrogen atoms; for example pyrimidine and particularly 1,3,5-triazine radicals, which can be further substituted. These acyl radicals can all also contain free acid groups as substituents.

Dyestuffs of the formula (16a)

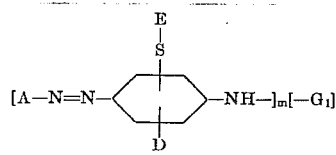

are particularly suitable, wherein $G_2$ denotes an acyl radical, bound through $m_1$ acyl groups to $m_1$ —NH— groups, of a substituted or unsubstituted aliphatic or aromatic monocarboxylic or di-carboxylic acid or of a heterocyclic monocarboxylic or di-carboxylic acid, $m_1=1$ or 2, and A, D and E have the significance indicated, the dyestuff molecule containing at least two sulphonic acid groups.

Amongst these dyestuffs, those of the formula (17)

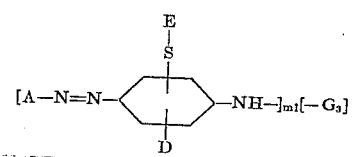

are preferred, wherein $G_3$ denotes an acyl radical, bound through $m_1$ acyl groups to $m_1$ —NH— groups, of an aliphatic monocarboxylic acid having at most 10 carbon atoms, a substituted or unsubstituted benzene monocarboxylic acid, an aliphatic dicarboxylic acid having at most eight carbon atoms including carbonic acid, a substituted or unsubstituted benzene, thiophene, furane or pyridine dicarboxylic acid or an aromatic dicarboxylic acid of the formula (17a)  HOOC—Ph—M—Ph'—COOH wherein Ph and Ph' each represents a substituted or unsubstituted phenylene radical and M represents an oxygen or sulphur atom or an —$SO_2$—, —$CH_2$—, —CO— or —HN—CO—NH— group, $m_1=1$ or 2, and A, D and E have the significance indicated, the dyestuff molecule containing at least two sulphonic acid groups.

Where $m_1=1$, $G_3$ is an acyl radical of an aliphatic carboxylic acid having preferably at most 10 carbon atoms, or a benzoyl radical which may be substituted further. Where $m_1=2$, $G_3$ is an aliphatic dicarboxylic acid radical, for example a —CO—, glutaryl or fumaryl radical or an aromatic dicarboxylic acid radical, for example a terephthaloyl or isophthaloyl radical, or a heterocyclic dicarboxylic acid radical, for example a thiophene, furane or pyridine dicarboxylic acid radical.

Particularly advantageous dyestuffs here correspond to the formula (18)

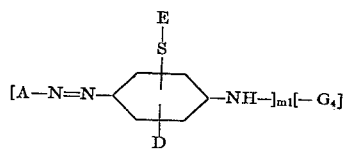

wherein $G_4$ denotes an acyl radical bound through $m_1$ acyl groups to $m_1$ —NH— groups, and where $m_1=1$, a monoacyl radical of an aliphatic monocarboxylic acid having at most five carbon atoms or of a substituted or unsubstituted benzene monocarboxylic acid and, where $m_1=2$, a diacyl radical of glutaric, fumaric, terephthalic, isophthalic, thiophene-2,5-dicarboxylic or pyridine-2,6-dicarboxylic acid or a radical of the formula —CO— or —OC—$p$—$C_6H_4$—NH—CO—NH—$p$—$C_6H_4CO$—, and A, D and E have the significance indicated, the dyestuff molecule containing at least two sulphonic acid radicals.

Photographic material which contains at least one dyestuff of the following three formulas behaves particularly advantageously:

(19)

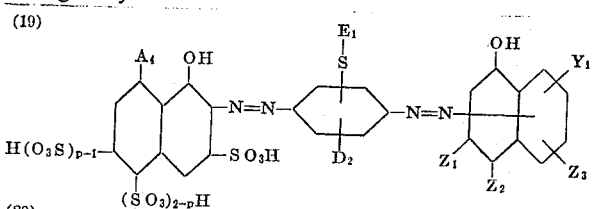

(20)

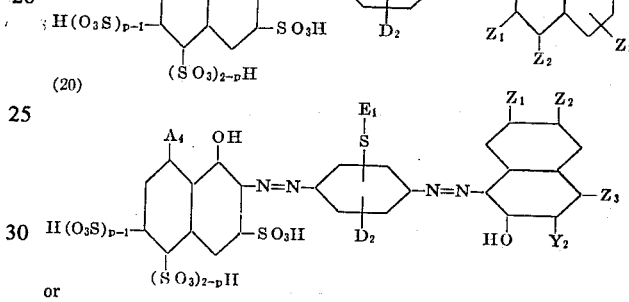

or (21)

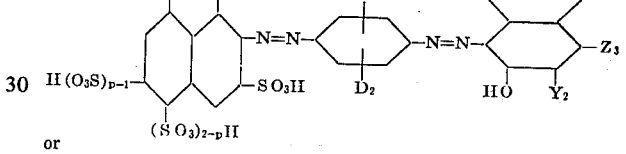

In these formulas $A_4$, $E_1$, $D_2$, $Y_1$, $Y_2$, $Z_1$, $Z_2$, $Z_3$, $G_4$, $p$ and $m_1$ have the significance indicated, and in formula (19) the right-hand side azo group is in the 2-, 5-, or 8-position of the 1-naphthol radical, each dyestuff molecule containing at least two sulphonic acid groups.

Preferred dyestuffs of formulas (19) to (21) are the dyestuffs of the following formulas:

I

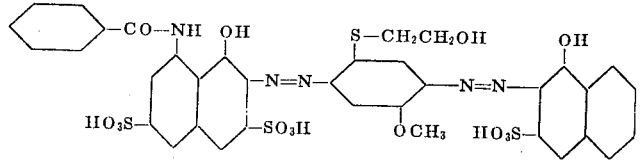

II

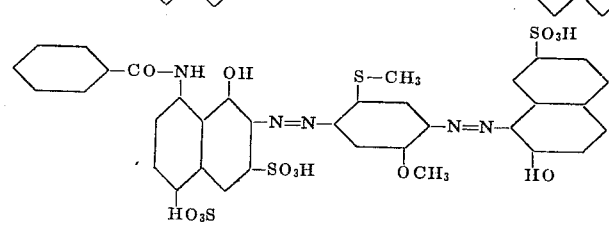

or

III

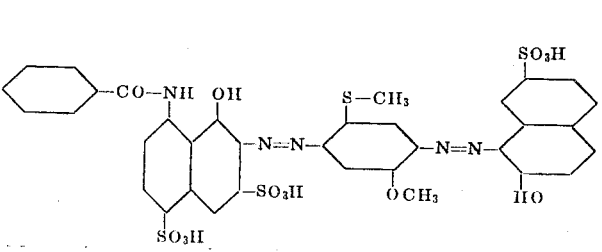

The dyestuffs of formula (1) can be used in the form of the free acid or as salts. Suitable salts are ammonium or metal salts, for example alkaline earth metal or alkali metal salts, for example calcium, sodium or potassium salts.

The radical of the formula

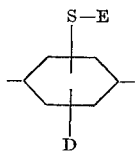

in formula (1) is derived from substituted 4-nitroanilines which may be manufactured according to known methods. Suitable substances for this purpose are, for example: 2-methoxy-4-nitro-5-methylmercaptoaniline, 2-methoxy-4-nitro-5-(β-hydroxyethyl)-mercaptoaniline, 2-methyl-4-nitro-5-(β-hydroxyethyl)-mercaptoaniline, 2-(β-hydroxyethyl)-4-nitro-5-(β-hydroxyethyl)-mercaptoaniline, 2-methyl-4-nitro-5-methylmercaptoaniline, 3-(β-hydroxyethyl)-mercapto-4-nitroaniline, 3-methylmercapto-4-nitroaniline, [2-nitro-4-methoxy-5-aminophenylthio]-acetic acid, 4-acetylamino-5-chloro-2-methylmercaptoaniline, 2-chloro-5-methylmercapto-4-nitroaniline, 2-methylmercapto-4-formylamino-5-methoxyaniline, 2-methylmercapto-4-formylamino-5-methylaniline, 3-amino-4-methylmercaptotoluene, 3-amino-4-(β-hydroxyethyl)-mercaptotoluene, 3-amino-4-methylmercaptoanisole, 3-amino-4-(β-hydroxyethyl)-mercaptoanisole, 2-methylmercapto-5-acetyl-aminoaniline, 2-methylmercapto-5-chloroaniline and 3-methylmercaptoaniline.

The radical A may be derived from coupling components, for example: 1,8-aminonaphthol-2,4-disulphonic acid, 1,8-aminonaphthol-3,5-disulphonic acid, 1,8-aminonaphthol-4,6-disulphonic acid, 1,8-aminonaphthol-3,6-disulphonic acid, 1,8-aminonaphthol-5-sulphonic acid, 1-(p-toluenesulphonyl)-amino-8-naphthol-5-sulphonic acid, 1-cyclohexylcarbonamido-8-naphthol-5-sulphonic acid, 1,8-aminonaphthol-4-sulphonic acid, 1-methylamino-8-naphthol-3,6- or 4,6-disulphonic acid, 1-dimethylamino-8-naphthol-3,6- or 4,6-disulphonic acid, 1-ethylamino-8-naphthol-3,6- or 4,6-disulphonic acid, 1-diethylamino-8-naphthol-3,6- or 4,6-disulphonic acid, 1-cyclohexylamino-8-naphthol-3,6- or 4,6-disulphonic acid, 1-benzylamino-8-naphthol-3,6- or 4,6-disulphonic acid, 1-phenylamino-8-naphthol-3,6- or 4,6-disulphonic acid, 1-phenylsulphonylamino-8-naphthol-3,6- or 4,6-disulphonic acid, 1-(p-toluenesulphonyl)-amino-8-naphthol-3,6- or 4,6-disulphonic acid, 1-acetylamino-8-naphthol-3,6-disulphonic acid, 1-succinylamino-8-naphthol-3,6-disulphonic acid, 1-maleylamino-8-naphthol-3,6-disulphonic acid, 1-ω-phenylacryloylamino-8-naphthol-3,6-disulphonic acid, 1-phenylacetylamino-8-naphthol-3,6-disulphonic acid, 1-α-naphthoylamino-8-naphthol-3,6disulphonic acid, 1-benzoylamino-8-naphthol-3,6- or 4,6-disulphonic acid, 1-(4'-chlorobenzoylamino)-8-naphthol-3,6- or 4,6-disulphonic acid, 1-(3'-chlorobenzoylamino)-8-naphthol-3,6-disulphonic acid, 1-(2'-chlorobenzoylamino)-8-naphthol-3,6-disulphonic acid, 1-(2', 4'-dichlorobenzoylamino-8-naphthol-3,6- or 4,6-disulphonic acid, 1-(3', 4'-dichlorobenzoylamino)-8-naphthol-3,6-disulphonic acid, 1-(2'-chloro-4'-nitrobenzoylamino)-8-naphthol-3,6-disulphonic acid, 1-(4'-chloro-3'-nitrobenzoylamino)-8-naphthol-3,6-disulphonic acid, 1-(2'-chloro-5'-nitrobenzoyl)-amino-8-naphthol-3,6-disulphonic acid, 1-(4'-chloro-3'-methylsulphonylbenzoyl)-amino-8-naphthol-3,6-disulphonic acid, 1-(4'-chloro-3'-sulphonamidobenzoyl)-amino-8-naphthol-3,6-disulphonic acid, 1-(3'-chloro-5'-glutarylaminobenzoyl)-amino-8-naphthol-3,6-disulphonic acid, 1-(3'-trifluoromethylbenzoyl)-amino-8-naphthol-3,6-disulphonic acid, 1-(p-nitrobenzoyl)-amino-8-naphthol-3,6-disulphonic acid, 1-(m-nitrobenzoyl)-amino-8-naphthol-3,6-disulphonic acid, 1-(3',5'-dinitrobenzoyl)-amino-8-naphthol-3,6-disulphonic acid, 1-(3',5'-dimethoxybenzoyl)-amino-8-naphthol-3,6-disulphonic acid, 1-(p-sulphonamidebenzoyl)-amino-8-naphthol-3,6-disulphonic acid, 1-(m-sulphonamidobenzoyl)-amino-8-naphthol-3,6-disulphonic acid, 1-(m-sulphobenzoyl)-amino-8-naphthol-3,6-disulphonic acid, 1-(p-carbonamidobenzoyl)-amino-8-naphthol-3,6-disulphonic acid, 1-(p-methylsulphonylbenzoyl)-amino-8-naphthol-3,6-disulphonic acid, 1-(m-methylsulphonylbenzoyl)-amino-8-naphthol-3,6-disulphonic acid, 1-(4'-phenylsulphonylbenzoyl)-amino-8-naphthol-3,6-disulphonic acid, 1-(p-carbamylbenzoyl)-amino-8-naphthol-3,6-disulphonic acid, 1-(p-formylaminobenzoyl)-amino-8-naphthol-3,6-disulphonic acid, 1-(p-acetylaminobenzoyl)-amino-8-naphthol-3,6- or 4,6-disulphonic acid, 1-(m-acetylaminobenzoyl)-amino-8-naphthol-3,6-disulphonic acid, 1-(p-succinylaminobenzoyl)-amino-8-naphthol-3,6-disulphonic acid, 1-(p-maleylaminobenzoyl)-amino-8-naphthol-3,6-disulphonic acid, 1-(p-valerylaminobenzoyl)-amino-8-naphthol-3,6-disulphonic acid, 1-(p-butyrylaminobenzoyl)-amino-8-naphthol-3,6-disulphonic acid, 1-(m-glutarylaminobenzoyl)-amino-8-naphthol-3,6-disulphonic acid, 1-(p-benzoylaminobenzoyl)-amino-8-naphthol-3,6-disulphonic acid, 1-(p-mesylaminobenzoyl)-amino-8-naphthol-3,6-disulphonic acid, 1-(p-toluenesulphonyl-p-aminobenzoyl)-amino-8-naphthol-3,6-disulphonic acid, 1-[p-(3'-carboxyphenylsulphonyl)-aminobenzoyl]-amino-8-naphthol-3,6-disulphonic acid, 1-(4'-benzoyl-benzoyl)-amino-8-naphthol- 3,6-disulphonic acid, 1-(3'-benzoyl-benzoyl)-amino-8-naphthol-3,6-disulphonic acid, 1-(3'-carboxy-benzoyl)-amino-8-naphthol-3,6-disulphonic acid, 1-(4'-carboxy-benzoyl)-amino-8-naphthol-3,6-disulphonic acid, 1-(picolinyl)-amino-8-naphthol-3,6-disulphonic acid, 1-(nicotinyl)-amino-8-naphthol-3,6-disulphonic acid, 1-(isonicotinyl)-amino-8-naphthol-3,6-disulphonic acid, 1-(2'-furoyl)-amino-8-naphthol-3,6-disulphonic acid, 1-(2'-thienoyl)-amino-8-naphthol-3,6-disulphonic acid, 1-(2-pyridoyl)-amino-8-naphthol-3,6-disulphonic acid, 1-(1'[p-sulphophenylamino]-3'-chlorotriazinyl-amino-8-naphthol-3,6-disulphonic acid, 1-(cyclohexanoylamino)-8-naphthol-disulphonic acid, 1-amino-8-naphthol-3,6-(N,N'-diethyl)-disulphonamide, 1-acetylamino-8-naphthol-3,6-disulphonic acid diethylamide, 1,8-dihydroxynaphthalene-3,6-disulphonic acid, 1-methoxy-8-naphthol-3,6-disulphonic acid, 1-benzyloxy-8-naphthol-3,6-disulphonic acid, 1-phenoxy-8-naphthol-3,6-disulphonic acid, 1-hydroxyethoxy-83,6-disulphonic acid and 1-chloro-8-naphthol-3,6-disulphonic acid.

The radical K as a diazo component is derived from substituted aromatic amines, for example: p-nitroaniline, m-nitroaniline, 2-methyl-5-chloro-4-nitroaniline, 2-methoxy-5-chloro-4-nitroaniline, 3-acetylaminoaniline, 2-amino-4-acetylaminotoluene, 2-(β-hydroxyethoxy)-4-nitroaniline, 2-amino-5-nitro-diphenylether, 2-amino-4-benzoylamino-benzene sulphonic acid, 2-amino-4-(4'-chlorobenzoylamino)-benzene sulphonic acid, 2-amino-4-(4'-methoxybenzoylamino)-benzene sulphonic acid, 3-amino-6-benzoylamino-benzene sulphonic acid, 2-amino-5-benzoylamino-benzene sulphonic acid, 2-amino-5-nitrobenzoic acid, methyl-(2-nitro-5-aminophenyl)-sulphone, 1-amino-8-naphthol-2,4-disulphonic acid, 2-aminonaphthalene-4,8-disulphonic acid, 1-amino-8-naphthol-3,6-disulphonic acid-0-benzene sulphonic acid ester, 2-amino-6-nitronaphthalene-4,8-disulphonic acid, 1-aminonaphthalene-3,8-disulphonic acid, 1-aminonaphthalene-5-sulphonic acid, 1-aminonaphthalene-8-sulphonic acid, 1-aminonaphthalene-3,6-disulphonic acid, 1-amino-4-nitronaphthalene-6-sulphonic acid, 1,4-diaminonaphthalene-2-sulphonic acid, 1-amino-5-naphthol-7-sulphonic acid tosyl ester, 2-amino-5-naphthol-7-sulphonic acid tosyl ester, 2-amino-8-naphthol-6-sulphonic acid tosyl ester, 2-aminonaphthalene-6,8-disulphonic acid, 2-aminonaphthalene-5,7-disulphonic acid, 2-aminonaphthalene-4,6,8-trisulphonic acid and 4-amino-3-sulpho-4'-benzoylamino-diphenyl.

The radical K as a coupling component for example may be derived from the following compounds: 1-naphthol-3-sulphonic acid, 2-naphthol-7-sulphonic acid, 2-naphthol-6-sulphonic acid, 2-naphthol-4-sulphonic acid, 1-naphthol-3- sulphonic acid methoxypropylamide, 2-naphthol-6-sulphonic acid methoxypropylamide, 2-naphthol-7-sulphonic acid methoxypropylamide, 2-naphthol-7-sulphonic acid phenylamide, 2-naphthol-7-sulphonic acid cyclohexylamide, 2-naphthol-7-sulphonic acid methylamide, 2-naphthol-7-sulphonic acid dimethylamide, 2-naphthol-7-sulphonic acid iso-propylamide, 2-naphthol-7-sulphonic acid morpholidamide, 2-naphthol-7-sulphonic acid ethylamide, 2-naphthol-7-sulphonic acid amide, 2-naphthol-7-sulphonic acid oxethylamide, 2-naphthol-7-benzylsulphone, 2-naphthol-7-sulphonic acid (4'-sulphophenyl)-amide, 2-naphthol-7-sulphonic acid N'-methylpiperazide, 2-naphthol-7-sulphonic acid benzylamide, 1-naphthol-3-sulphonic acid di-n-butylamide, 1-naphthol-3-sulphonic acid di-n-propylamide, 1-naphthol-3-sulphonic acid n-octylamide, 1-naphthol-3-sulphonic acid amide, 1-naphthol-3 -sulphonic acid methylamide, 1-naphthol-3-sulphonic acid β-hydroxyethylamide, 1-naphthol-3-sulphonic acid phenylamide, 2-hydroxy-3-naphthoic acid (3'-carboxy)-anilide, 2-hydroxy-3-naphthoic acid (3',5'-dicarboxy)-anilide, 2-hydroxy-3-naphthoic acid (4'-carboxy)-1'-naphthylamide, 2-hydroxy-3-naphthoic acid (3'-sulpho)-anilide, 2-hydroxy-3-napthoic acid (4'-methoxy-3'-sulpho)-anilide, 2-hydroxy-3-naphthoic acid (4'-chloro-3'-sulpho)-anilide, 2-hydroxy-3-naphthoic acid (2'-methyl-3'-chloro-5'-sulpho)-anilide, 2-hydroxy-3-naphthoic acid (2'-methoxy-4'-nitro-3'-sulpho)-anilide, 2-hydroxy-3-naphthoic acid-(4'-phenoxy-2'-sulpho)-anilide, 2-hydroxy-3-naphthoic acid (4'-thiophenoxy-2'-sulpho)-anilide, 2-hydroxy-3-naphthoic acid (3',4'2-hydroxy-3-naphthoic acid (4'-sulpho)-1'-naphthylamide, 2-hydroxy-3-naphthoic acid (3'-sulpho-4'-[naphthyl-2'']-thioether)-anilide, 1-phenyl-3-carboxy-pyrazolone-5, 1-phenyl-3-β-ethoxy-carbethoxy-pyrazolone-5, 1-phenyl-3-methyl-pyrazolone-5, 1-(3'-octanoylamino)-phenyl-3-carboxy-pyrazolone-5, 1-(3'-sulpho-4'-phenoxy)-phenyl-3-heptadecyl-pyrazolone-5 and 1-(2'-chloro-5'-sulpho)-phenyl-3-methyl-pyrazolone-5.

K can also represent radicals of such aminonaphthols as have been described for A.

Where $m$ in formula (2)=1, G is derived from anhydrides or especially from chlorides of monocarboxylic or monosulphonic acids, for example: acetic anhydride, propionyl chloride, methylsulphonic acid chloride, butyryl chloride, caproyl chloride, lauroyl chloride, stearoyl chloride, benzoyl chloride, toluene sulphonic acid chloride, 3,5-dinitrobenzoyl chloride, p-acetylaminobenzoyl chloride, nicotinic acid chloride, 3,4-dichlorobenzoyl chloride, thiophene-2-carboxylic acid chloride and 4-chloro-3-nitrobenzoyl chloride.

Where $m$ is 2 or 3, G is derived from anhydrides and especially from halides of acylating components which are at least dibasic.

As anhydrides succinic anhydride, chlorosuccinic anhydride or glutaric anhydride, may for example be mentioned.

Preferably however, the bridge members are derived from dihalides, and in particular, for example from phosgene, succinic acid dichloride, adipic acid dichloride, thiophosgene, glutaric acid dichloride, pimelic acid dichloride, chlorosuccinic acid dichloride, 2,3-dichlorosuccinic acid dichloride, fumaric acid dichloride, terephthaloyl chloride, isophthaloyl chloride, 5-nitroisophthaloyl chloride, thiophene-2,5-dicarboxylic acid dichloride, furane-2,5-dicarboxylic acid dichloride, pyridine-2,5-dicarboxylic acid dichloride, pyridine-2,6-dicarboxylic acid dichloride, pyridine-3,5-dicarboxylic acid dichloride, pyrrole-2,5-dicarboxylic acid dichloride, diphenyl-urea-4,4'-dicarboxylic acid dichloride, diphenylketone-4,4'-dicarboxylic acid dichloride, diphenylsulphone-4,4-dicarboxylic acid dichloride, benzene-1,3-disulphonic acid dichloride, diphenylmethane-4,4'-dicarboxylic acid dichloride, diphenylsulphide-4,4'-dicarboxylic acid dichloride, 4,6-dichloropyrimidine, 1-phenyl-3,5-dichloro-2,4,6-triazine or 1-methoxy-3,5-dichloro-2,4,6-triazine. Cyanuryl chloride can also be used.

The dyestuffs of formula (2), wherein $n=2$, may be manufactured according to various known methods.

1.1 An appropriately substituted aniline, which in the 4-position further carries a group which can be converted into an amino group, is diazotized and coupled to AH. When A contains a free amino group, this group can be acylated.

In the monoazo dyestuff thus obtained, the substituent in the 4-position which has been mentioned is converted into the amino group; the aminoazo dyestuff is then diazotized and coupled to K—H.

When K also contains a free amino group or a group which can be converted into an amino group, this can further be acylated. Disazo or tetrazo dyestuffs may be then obtained, as desired.

1.2 An aniline substituted as described under 1.1 is diazotized and coupled to K—H. Various possibilities exist for the monoazo dyestuff thus obtained:

1.2.1 K contains a free amino group: this can be acylated, the group convertible to an amino group which is also present can then be converted, the compound thus obtained can be diazotized or tetrazotized and coupled with A—H.

1.2.2 K—H is a naphthol: the group which is convertible to an amino group is immediately converted, diazotized and coupled to A—H. If necessary, the radical A can further be acylated.

1.3.1 When K—$NH_2$ is a diazo component: K—$NH_2$ is diazotized and coupled to an aniline which in the 2- or 3-position contains an —S—E radical and in the 5- or 6-position contains a D— radical. The monoazoamine thus obtained is then diazotized and coupled to A—H. When K—$NH_2$ also contains an additional group convertible into an amino group, this group can be converted into the amino group and acylated. Disazo or tetrazo dyestuffs may be obtained, as desired.

1.3.2 When K—$NH_2$ is a diazo component having a further group convertible into an amino group, K—$NH_2$ can first be acylated. Monoacyl or diacyl components are obtained, as desired. The group or groups convertible into the amino group can then be converted, diazotized or tetrazotized and coupled to an aniline which in the 2- or 3-position contains an —S—E— radical and in the 5- or 6-position contains a D— radical. The monoazoamines or disazoamines thus obtained are diazotized or tetrazotized and coupled to A—H.

The dyestuffs of formula (2) wherein $n=1$, can also be manufactured according to various known methods.

2.1 An aniline which is suitably substituted and which also carries a group convertible into an amino group in the 4-position, is diazotized and coupled to A—H. When A contains a free amino group, this group can be acylated. The 4-substituent mentioned is then converted into an amino group and the monoazoamine thus obtained is treated with an acylating agent.

2.2 An appropriately substituted 4-nitroaniline is reacted with an acylating agent. Monoanilides or dianilides are obtained, as desired. The nitro group or groups are then reduced, and the product diazotized or tetrazotized and coupled to A—H.

Suitable acylating agents are: carboxylic acid anhydrides, for example acetic anhydride, dicarboxylic acid anhydrides, for example glutaric anhydride, carboxylic acid chlorides, for example benzoyl chloride, dicarboxylic acid chlorides, for example terephthaloyl chloride, sulphonic acid chlorides, for example p-toluenesulphonyl chloride, disulphonic acid chlorides, for example naphthalene-1,5-disulphonic chloride, isocyanates, for example phenylisocyanate, di-isocyanates, for example hexamethylenediisocyanate, ketene and N-heterocyclic compounds, for example 1-methoxy-3,5-dichloro-2,4,6-triazine.

The alkylmercaptoanilines with which the middle components are introduced into the dyestuffs of formula (1) can be manufactured according to two different methods. A 1-chloro-2-nitro-5-aminobenzene can for example be converted into a 1-alkylmercapto-2-nitro-5-aminobenzene by reaction with an alkanethiol and subsequently reduced to the diamine by means of hydrogen and palladium/carbon.

A further method consists of reacting 1-chloro-2-nitro-5-aminobenzene with sodium disulphide, so that two 2-nitro-5-aminobenzene radicals are linked to one another through an —S—S— bridge, reducing the product with sodium sulphide to the corresponding thiol, converting this product into the corresponding alkylmercapto compound by reaction with a dialkyl sulphate, and then reducing the alkylmercapto compound to the corresponding diamine as previously indicated.

The dyestuffs of formula (1) can also be converted into their heavy metal complexes, by treating them with the corresponding heavy metal compound in an alkaline to weakly acid medium. These heavy metal compounds are advantageously water-soluble and are preferably compounds of metals having ordinal numbers 22 to 29, that is to say compounds of titanium, vanadium, chromium, manganese, nickel or copper. These heavy metal compounds can be derived from inorganic and organic acids, and are for example chlorides, sulphates, nitrates, formates or acetates.

The dyestuffs of formula (1) may be used for various purposes in photographic materials and especially advantageously as image dyestuffs for the silver dyestuff bleaching process. In accordance therewith, valuable photographic materials can be manufactured in the usual manner by known methods, which contain on a layer support at least one layer having a dyestuff of formula (1).

In particular, these dyestuffs can be present in a multilayer material which on a layer support contains a selectively red-sensitive layer dyed cyan with a dyestuff of formula (1), on top of this a selectively green-sensitive layer dyed with a magenta dyestuff and finally a blue-sensitive layer dyed with a yellow dyestuff. The dyestuffs of formula (1) may also be incorporated in an auxiliary layer or especially into a layer adjacent to the light-sensitive layer.

The dyestuffs of formula (1) can also for example, be used for retouching purposes.

In most cases it suffices to add the dyestuffs to be used according to the invention to an aqueous gelatine solution as an aqueous solution or in a solvent which is miscible with water at normal or slightly elevated temperature with good stirring. Thereafter this mixture is brought together with a gelatine containing silver halide and/or other materials for producing photographic images, cast onto a substrate in the usual manner to give a layer, and dried when necessary.

The dyestuff solution can also be added directly to gelatine containing silver halide and/or other materials for producing photographic images. Thus, for example the dyestuff solution may be added immediately before casting.

Instead of simple stirring, the usual methods of distribution by means of kneading and/or shear forces or ultrasonics can also be employed.

The dyestuff may also be added in solid form or as a paste.

The casting solution can also contain further additives for example curing agents, sequestering agents and wetting agents, as well as sensitizers and stabilizers for the silver halide.

The dyestuffs neither undergo chemical reactions with the light-sensitive materials nor influence their sensitivity to light. The dyestuffs of formula (1) are diffusion-resistant and also form stable, aqueous solutions, they are insensitive to calcium ions and can be bleached white.

On addition to the casting solutions, the dyestuffs neither cause an increase in viscosity nor a significant change in viscosity when the casting mixture is left to stand.

The spectral absorption in gelatine lies in an advantageous region, so that the dyestuffs of formula (1) can be combined with a suitable yellow and magenta dyestuff to give a triple dyestuff combination which shows grey shades which appear neutral to the eye over the entire density range.

MANUFACTURING INSTRUCTIONS

1 Alkylmercaptoanilines 1.1 Seventy-one g. of 3-chloro-6-methyl-4-nitroaniline are dissolved in 1,400 ml. of glacial acetic acid at 63° C. Thereafter a total of 150 ml. of acetic anhydride is added in three portions. After a total reaction time of 2½ hours at 60° to 70° C. the mixture is cooled to 18° C., and the crystals which have precipitated are filtered, washed with 2 portions of 500 ml. of benzene and dried in vacuo at 70° C. Fifty-five grams of 3-chloro-6-methyl-4-nitroacetanilide of melting point 176° to 177° C. are obtained. A sample recrystallized from benzene melted at 181.4° C.

7.4 g. of 3-chloro-6-methyl-4-nitroacetanilide are dissolved in 100 ml. of ethanol and the solution heated to the boil. A mixture of 4.8 g. of magnesium sulphate, 4.8 g. of $Na_2S.9H_2O$ and 0.6 g. of sulphur, fused in a test tube, is then added during 5 minutes to the ethanolic solution and the whole is boiled for 3 hours under reflux. After 1½ hours a crystalline precipitate forms. At the end of the reaction the mixture is adjusted to pH 1–2 with 10 ml. of 2 N hydrochloric acid and filtered. The residue is washed with 100 ml. of water and dried in vacuo at 60° C. Yield: 5.2 g. of 2,2'-dinitro-4,4'-dimethyl-5,5'-diacetylaminodiphenyldisulphide of melting point 230° C. (decomposition).

2-Methyl-4nitro-5-methylmercaptoacetanilide 1.8 g. of 2,2'-dinitro-4,4'-dimethyl-5,5'-diacetylaminodiphenylsulphide are suspended in 50 ml. of water. A solution of 0.7 g. of $Na_2S.9H_2O$ and 1.5 ml. of 30 percent sodium hydroxide solution and 5 ml. of water is added dropwise thereto. After the mixture has been boiled for 10 minutes under reflux, a clear solution is produced which is filtered hot and 1 g. of dimethyl sulphate is added dropwise to the filtrate. The mixture is stirred for 30 minutes at 40° C. and stirring is continued overnight at room temperature. The yellow crystals are filtered and washed with 20 ml. of water. The residue is recrystallized from 20 ml. of ethanol. Yield: 0.12 g. of 2-methyl-4-nitro-5-methylmercaptoacetanilide of melting point 155° to 158° C.

1.2 An ethanolic solution of 26 g. of potassium methylmercaptide is slowly added dropwise to a solution of 40.5 g. of 2-amino-4-chloro-5-nitroanisole in 600 ml. of dimethylformamide at 80° C. The mixture is stirred for 6 hours at 80° C., cooled and poured into 4,000 ml. of cold water, and the product is filtered and washed. AFter drying, 38 g. of 2-methoxy-4-nitro-5-methylmercaptoaniline of melting point 200° to 201° C. (=89 percent of theory) are obtained.

The following anilines may be manufactured analogously:

| | Melting point |
|---|---|
| 2-methoxy-4-nitro-5-(β-hydroxyethyl)-mercaptoaniline | 170° to 171° C. |
| 2-methyl-4-nitro-5-(βhydroxyethyl)-mercaptoaniline | 164° to 165° C. |
| 2-(β-hydroxyethoxy)-4-nitro-5-(β-hydroxyethyl)-mercaptoaniline | 150° to 151° C. |
| 2-methyl-4-nitro-5-methylmercapto-aniline | 160° to 161° C. |
| 3-methylmercapto-4-nitroaniline | 145° to 147° C. |
| 3-methylmercapto-4-nitroaniline | 179° to 181° C. |

1.3 Thirty-two g. of 2-methoxy-4-nitro-5-methylmercaptoaniline together with 300 ml. of 99 percent formic acid are heated for 15 minutes under reflux with stirring. The mixture is then cooled and poured into 1,500 ml. of water. The precipitate is filtered, washed with water and dried in vacuo at 60° C.; 35.7 g. of 2-methylmercapto-4-nitro-5-methoxyformamide of melting point 222° to 224° C. are obtained.

12.1 g. of this formanilide are suspended in 300 ml. of methylcellosolve and hydrogenated at room temperature using 1 g. of palladium on active charcoal (10 percent). After completion of the hydrogenation the catalyst is filtered and the solvent is evaporated in vacuo. The oily residue is mixed with 20 ml. of hot n-propanol and 10 ml. of petroleum ether. After cooling, the crystals which separate are filtered and dried; 7.1 g. of 2-methylmercapto-4-formylamino-5-methoxyaniline of melting point 97° to 99° C. are obtained.

2 Dyestuffs of formula (1) (The spectral data are summarized in tables I, II AND III)

2.1 4.6 g. of 2-methoxy-4-nitro-5-methylmercaptoaniline are stirred for 1 hour with 20 ml. of 37 percent hydrochloric acid. Twenty g. of ice are then added and the solution is diazotized with 7 ml. of 4 N sodium nitrate solution. The diazonium solution is slowly poured into a 0.5 percent solution of 14.5 g. of 1-(p-toluenesulphonylamino)-8-naphthol-3,6-disulphonic acid in 100 ml. of water and 20 g. of ice. The reaction mixture is buffered from pH 2 to 5 with a 7 N potassium acetate solution, and stirred for 3 hours at 0° C. It is then heated to 60° C. and filtered. The residue is dissolved in 300 ml. of water by means of 2 N sodium hydroxide solution and then precipitated with 600 ml. of a 7 N potassium acetate solution. After repeated solution and precipitation with 7 N potassium acetate solution, the product is filtered and the residue dried in vacuo at 60° C. Yield of nitroazo dyestuff: 16 g.

Fourteen g. of the nitroazo dyestuff are dissolved in 250 ml. of water at 50° C. A solution of 7.3 g. of $Na_2S.9H_2O$ in 10 ml. of water is added thereto and the mixture is stirred for one hour at 50° C. AFter cooling, the reaction mixture is filtered. The azoamine is precipitated with 500 ml. of 7 N potassium acetate solution, filtered and washed with 250 ml. of ethanol. After drying, 7.2 g. of the monoazoamine of the formula (22)

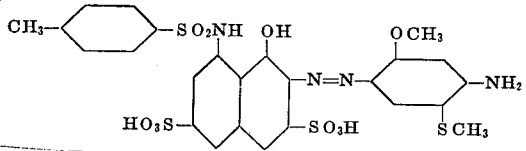

are obtained.

3.3 g. of the monoazoamine of formula (22) are dissolved in 100 ml. of water and mixed with 2 ml. of 4 N sodium nitrite solution. This solution is slowly added dropwise to a solution of 10 ml. of naphthalene sulphonic acid solution (1 liter of this naphthalene sulphonic acid solution contains 1 mol of β-naphthalene sulphonic acid and 1 mol of sulphuric acid) in 50 ml. of ice water. The whole is stirred for one hour at 0° to 4° C. 2.5 g. of 2-naphthol-7-sulphonic acid are dissolved in 100 ml. of water and introduced into the above diazo solution at 0° to 2° C. The reaction mixture is adjusted to pH 8 with 250 ml. of pyridine and is then stirred for 12 hours at 0° to 2° C. It is then heated to 50° C. and mixed with 500 ml. of 7 N potassium acetate solution and 700 ml. of methanol. The precipitated dyestuff is filtered, redissolved in water and again precipitated with potassium acetate. After 5-fold precipitation and drying at 80° C., 0.6 g. of the dyestuff of the formula (IV)

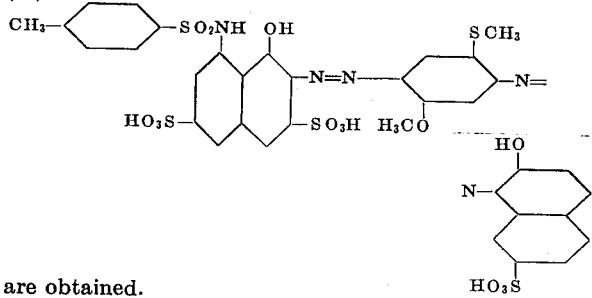

are obtained.

The dyestuff of the formula (V)

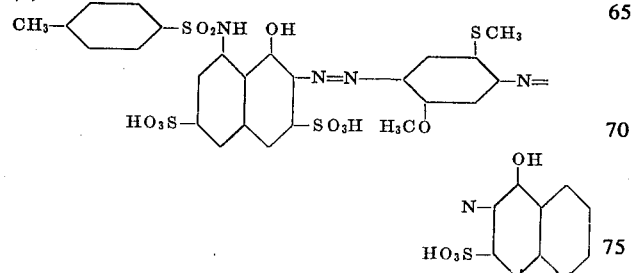

may be obtained in a similar manner.

2.2 10.5 g. of 2-methoxy-4-nitro-5-methylmercaptoaniline are stirred for 15 minutes with 50 ml. of 37 percent hydrochloric acid, mixed with 20 ml. of 4 N sodium nitrite solution at 0° C. and stirred for 1 hour at 0° C. Twenty-four g. of 2-napthol-7-sulphonic acid are dissolved in 400 ml. of water. The above diazo solution is slowly added dropwise to this solution and 150 ml. of a 7 N potassium acetate solution are then added. The reaction mixture is stirred for 12 hours at 0° C. and then heated to 50° C. The resulting precipitate is filtered.

The moist precipitate is dissolved in 350 ml. of water at 50° C. and mixed with 25 percent sodium hydroxide solution to pH 10. Twenty-five g. of $Na_2S.9H_2O$ are then added and the reaction mixture is stirred at 50° C. until reduction is complete. The precipitate formed is filtered, dissolved 3 times in water by heating and precipitated with 20 percent potassium chloride solution. After drying, 6.3 g. of the monoazoamine of the formula (23)

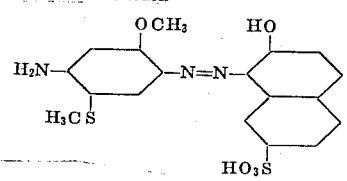

are obtained.

2.1 g. of the monoazoamine of formula (23) are diazotized as described in instruction 2.1. The diazo solution thus obtained is added to a solution of 4.2 g. of 1-benzoylamino-8-naphthol-4,6-disulphonic acid in 150 ml. of water. The mixture is then treated with 250 ml. of pyridine so that the pH value rises to 7. The mixture is stirred for 12 hours at 0° C., then heated to 50° C. and mixed with 150 ml. of 7 N potassium acetate solution. The dyestuff which has precipitated is filtered, twice dissolved in 200 ml. of hot water/dimethylformamide 1:1, and precipitated with 50 ml. of 20 percent ethanolic potassium acetate solution. The product is filtered and washed with 100 ml. of methanol. After drying, 2.3 g. of the dyestuff of formula (III) are obtained.

The dyestuff of formula (II) may be obtained in a similar manner.

2.3 3.6 g. of 2-methylmercapto-4-formylamino-5-methoxyaniline are dissolved in ml. of formic acid. After adding 250 g. of ice, 5 ml. of 4 N sodium nitrate solution are added dropwise and the reaction solution is stirred for a further 30 minutes. 8.5 g. of 2-naphthol-7-sulphonic acid are dissolved in 100 ml. of water. The above diazo solution is then added at 0° C. A further 100 g. of ice are then introduced, and then 50 ml. of 7 N potassium acetate solution and 150 ml. of 30 percent sodium hydroxide solution are added. The mixture is stirred for a further 3 hours at 0° to 4° C. and pH 6.5. The resulting precipitate is filtered, dissolved in 100 ml. of water with 2 N sodium hydroxide solution until the mixture is neutral, precipitated with 10 ml. of 7 N potassium acetate solution and filtered; 6.7 g. of moist azo dyestuff are obtained. This dyestuff is a single substance according to thin layer chromatography.

6.7 g. of this moist azo dyestuff are suspended in 50 ml. of 37 percent hydrochloric acid and stirred for 15 minutes at 80° to 90° C. AFter cooling, the solid substance is filtered, suspended in 50 ml. of water, and dissolved in 25 percent sodium hydroxide solution to give a neutral solution. The azoamine is precipitated with 20 ml. of 7 N potassium acetate solution. The product is filtered, washed with ethanol and dried at 60° C. in vacuo. Yield: 5.1 g. of monoazoamine of the formula (24)

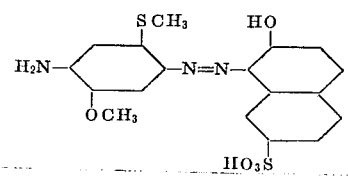

which is a single substance according to thin layer chromatography.

2.1 g. of the monoazoamine of formula (24) are diazotized as in instruction 2.1. The diazo solution thus obtained is slowly added at 0° to 4° C. to a 50 percent solution of 4.2 g. of 8-benzoylamino-1-naphthol-3,6-disulphonic acid in 150 ml. of water; 250 ml. of pyridine are then added, whereby the pH value rises from 2 to 7. The mixture stirred for a further 12 hours at 0° to 4° C., heated to 50° C. and the dyestuff is precipitated by adding 150 ml. of 20 percent ethanolic potassium acetate solution. After filtration, purification and drying, 2.8 g. of the dyestuff of the formula (VI)

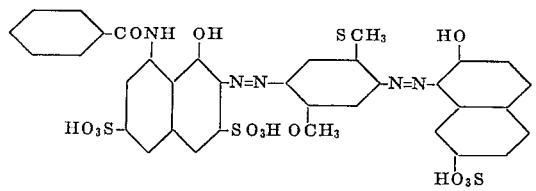

are obtained.

2.4 3.3 g. of the aminomonoazo dyestuff of the formula (25)

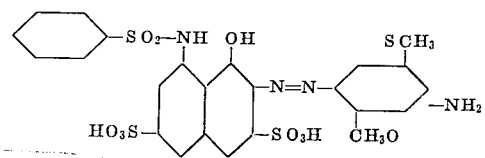

obtained by diazotization of 2-methoxy-5-methylmercapto-4-nitroaniline, coupling to N-benzenesulpho-8-amino-1-naphthol-3,6-disulphonic acid and reduction of the nitro group, are dissolved in the form of the sodium salt in 100 ml. of water, mixed with 5 ml. of naphthalene sulphonic acid solution (100 ml. of this solution contain one-tenth mol of naphthalene-2-sulphonic acid and one-tenth mol of sulphuric acid, that is to say a total of three-tenths equivalent of acid), and diazotized at 5° C. with 1.4 ml. of 4 N sodium nitrate solution.

The mixture is left to react for 1 hour at 5° C. while stirring, and the excess sodium nitrite is destroyed by adding the requisite amount of sulphamic acid.

The diazo solution is added at 15° C. to a solution of 2.2 g. of 2-naphthol-7-sulphonic acid and 1 g. of sodium tetraborate in 50 ml. of water and 15 ml. of pyridine. The pH value is kept at 9.7 during the entire coupling by adding 5 N sodium carbonate solution.

After 1 hour the dyestuff which has separated is filtered and purified by reprecipitation.

The compound of the formula (VII)

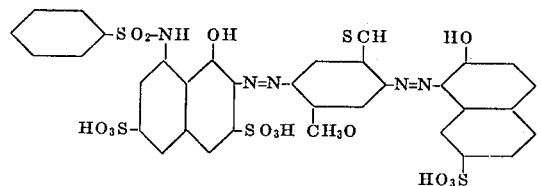

is obtained in the form of a black powder which is a single substance according to thin layer chromatography.

The dyestuffs of formulas (VIII) to (XVIII) of tables I and II may be obtained in a similar manner to that indicated in instructions 2.1 to 2.4.

2.5 3.3 g. of the aminomonoazo dyestuff of formula (25) in the form of the sodium salt are dissolved in 100 ml. of water and after addition of 4 g. of sodium tetraborate are phosgenated at pH 6.0 to 7.5 until no further starting product can be detected by thin layer chromatography.

The resulting precipitate is filtered, washed with ethanol and dried; 2.7 g. of the dyestuff of the formula (XIX)

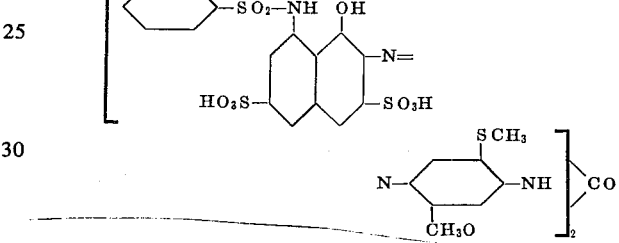

are obtained in the form of a dark blue powder with a reddish sheen.

The dyestuff of the formula (XX)

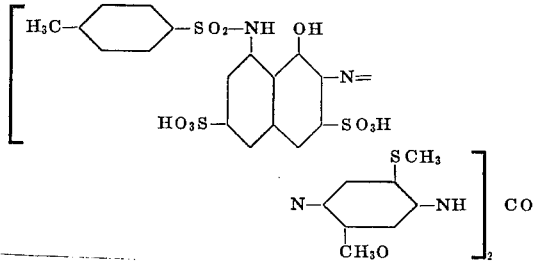

may be obtained in a similar manner.

Depending on the way in which they are separated, the dyestuffs of formulas (I) to (XX) are in the form of free acids or salts, preferably alkali metal salts, for example potassium or sodium salts.

TABLE I

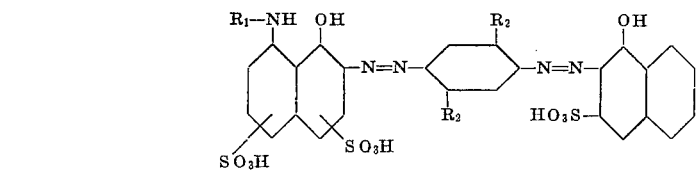

| Formula No. | $R_1$ | —$SO_3H$ position | $R_2$ | $R_3$ | Absorption maximum $\lambda_{max}$ in nm measured in— | |
|---|---|---|---|---|---|---|
| | | | | | $H_2O$/DMF 1=1 | Gelatine |
| I | Benzoyl- | 3- | —S$CH_2$ $\vert$ $CH_2OH$ | —O$CH_3$ | 612/658 | 638 |
| V | p-Toluenesulphonyl- | 3- | —O$CH_3$ | —S$CH_3$ | 635 | 625 |
| VIII | Benzoyl- | 3- | —S$CH_3$ | —$CH_3$ | 624/657 | 592 |
| IX | do | 4- | —S$CH_3$ | —$CH_3$ | 614/654 | 586 |
| X | do | 3- | —S$CH_3$ | —O$CH_3$ | 663 | 646/708 |
| XI | do | 4- | —S$CH_3$ | —O$CH_3$ | 661 | 639/697 |
| XII | do | 4- | —O$CH_3$ | —S$CH_3$ | 612/661 | 628 |
| XIII | do | 3- | —O$CH_3$ | —S$CH_3$ | 616/660 | 602 |

TABLE II

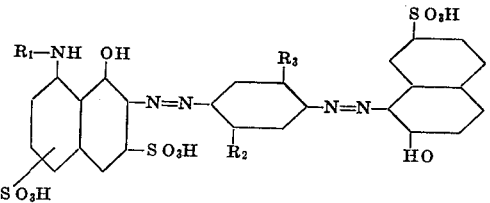

| Formula No. | $R_1$ | $-SO_3H$ position | $R_2$ | $R_3$ | Absorption maximum $\lambda_{max.}$ in nm measured in— | |
|---|---|---|---|---|---|---|
| | | | | | $H_2O$/DMG 1:1 | Gelatine |
| II | Benzoyl- | 3- | $-SCH_3$ | $-OCH_3$ | 623/664 | 604 |
| III | do | 4- | $-SCH_3$ | $-OCH_3$ | 624/660 | 601 |
| IV | p-Toluenesulphonyl- | 3- | $-OCH_3$ | $-SCH_3$ | 634 | 619 |
| VI | Benzoyl- | 3- | $-OCH_3$ | $-SCH_3$ | 660 | 598 |
| VII | Benzenesulphonyl- | 3- | $-OCH_3$ | $-SCH_3$ | 654 | 618 |
| XIV | Benzoyl- | 3- | $-SCH_3$ | $-CH_3$ | 616/650 | 584 |
| XV | do | 4- | $-SCH_3$ | $-CH_3$ | 612/646 | 580 |
| XVI | do | 4- | $-OCH_3$ | $-SCH_3$ | 614/657 | 616 |
| XVII | do | 3- | $-SCH_2\!-\!CH_2OH$ | $-OCH_3$ | 620/658 | 608 |
| XVIII | do | 3- | $-SCH_3$ | $-Cl$ | | 577/616 |

TABLE III

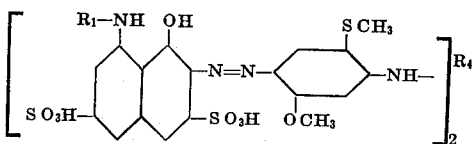

| Formula No. | $R_1$ | $R_4$ | Absorption maximum $\lambda_{max.}$ in nm measured in— | |
|---|---|---|---|---|
| | | | $H_2O$/DMF 1:1 | Gelatine |
| XIX | Benzenesulphonyl- | $-CO-$ | 600 | 614 |
| XX | p-Toluenesulphonyl- | $-CO-$ | 548 | 616 |

The following examples illustrate the invention.

EXAMPLE 1

3.3 ml. of a 6 percent gelatine solution, 2.0 ml. of a 1 percent aqueous solution of the hardener of the formula (26)

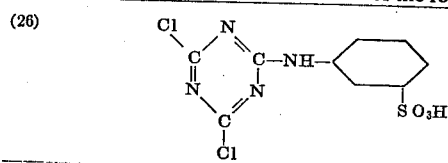

0.5 ml. of 1 percent aqueous solution of the cyan dyestuff of formula (I) and 3.3 ml. of a silver bromide emulsion containing 35 g. of silver per liter are pipetted into a test tube and made up to 10.0 ml. with deionized water. The whole is vigorously mixed and kept for 5 minutes at 40° C. in a water bath.

The casting solution at a temperature of 40° C. is poured onto a glass plate substrate size 13×18 cm. After solidification at 10° C., the plate is dried in a drying cabinet with circulating air at 32° C.

A strip cut to 3.5×18 cm. is exposed under a step wedge, through a Kodak 2b+49 blue filter with 50 Lux/cm.² for 3 seconds.

The processing is then carried out in accordance with the following method;

1. Seven minutes development in a bath which contains per liter 20 g. of anhydrous sodium sulphite, 1 g. of 4-methylamino-phenol sulphate, 4 g. of hydroquinone, 10 g. of anhydrous sodium carbonate and 2 g. of potassium bromide.
2. Two minutes stop-fixing in a bath which contains per liter 200 g. of sodium thiosulphate, 15 g. of sodium sulphite, 25 g. of crystalline sodium acetate and 13 ml. of glacial acetic acid.
3. Two and one-half minutes washing.
4. Eight minutes color bleaching in a bath which contains per liter 70 ml. of 37 percent hydrochloric acid, 20 g. of potassium bromide, 50 g. of thiourea and 5 mg. of a color bleaching catalyst of the formula (27)

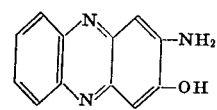

5. Two minutes washing.
6. Eight minutes bleaching of residual silver in a bath which contains per liter 100 ml. of 37 percent hydrochloric acid, 40 g. of crystalline copper sulphate and 25 g. of potassium bromide.
7. Two minutes washing.
8. Four minutes fixing as indicated under 2.
9. Ten minutes washing.

A brilliant, light-fast blue-green wedge is obtained which is completely bleached white in the position of the originally greatest silver density.

EXAMPLE 2

The following layers are successively applied to an opaque white acetate film provided with an adhesive layer;

1. Red-sensitive silver bromide emulsion in gelatin, containing the cyan dyestuff of formula (II).
2. Colorless gelatine layer without silver halide.
3. Green-sensitive silver bromide emulsion in gelatine, containing the magenta dyestuff of the formula (28)

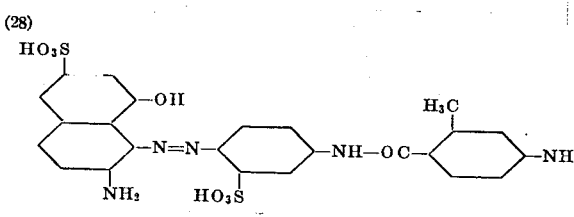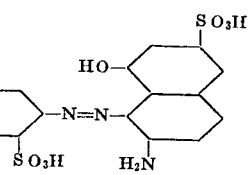

4. Blue-sensitive silver bromide emulsion in gelatine, containing the yellow dyestuff of the formula

(29) 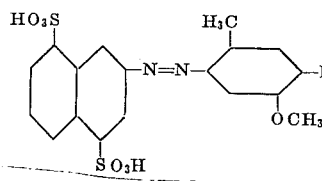

The gelatine layers can contain further additives for example wetting agents, hardeners and stabilizers for the silver halide. In other respects the procedure followed is such that the individual layers contain 0.5 g. of the particular dyestuff per square meter of film, and an amount of silver bromide corresponding to 1–1.2 g. of silver.

This film is exposed under a colored diapositive with red, green and blue copying light. The copy is then developed in accordance with the following instruction:

1. Six minutes development in a bath which contains per liter 50 g. of anhydrous sodium sulphite, 0.2 g. of 1-phenyl-3-pyrazolidone, 6 g. of hydroquinone, 35 g. of anhydrous sodium carbonate, 4 g. of potassium bromide and 0.3 g. of benztriazole;
2. Five minutes washing;
3. Six minutes fixing in a solution of 200 g. of crystalline sodium thiosulphate and 20 g. of potassium metabisulphite in 1 liter of water;
4. Five minutes washing;
5. Three to twelve minutes color bleaching with a solution which contains per liter of water 50 to 80 g. of potassium bromide, 40 to 80 g. of thiourea, 35 to 80 g. of 30 percent sulphuric acid and 0.001 to 0.01 g. of color bleaching catalyst of formula (27);
6. Ten minutes washing;
7. Five minutes bleaching of residual silver with a solution of 60 g. of crystalline copper sulphate, 80 g. of potassium bromide and 15 ml. of 30 percent hydrochloric acid per liter of water;
8. Five minutes washing;
9. Five minutes fixing as indicated under 3;
10. Five minutes washing.

A light-stable, document-fast positive viewing image is obtained.

Similar results are obtained when another dyestuff from one of tables I, II or III is used instead of the dyestuff of formula (II).

EXAMPLE 3

3.3 ml. of a 6 percent gelatine solution, 2.0 ml. of a 1 percent aqueous solution of the hardener of formula (26), 3.3 ml. of silver bromide emulsion containing 35 g. of silver per liter and 1.4 ml. of deionized water are pipetted into a test tube.

The whole is thoroughly mixed and kept in a water bath at 40° C. for 5 minutes.

The casting solution at a temperature of 40° C. is poured on a glass plate substrate size 13×18 cm. After solidifying at 10° C., the plate is dried in a drying cabinet with circulating air at 32° C.

A mixture of 3.3 ml. of a 6 percent gelatine solution, 2.0 ml. of a 1 percent aqueous solution of the hardener of formula (26), 0.5 ml. of a 1 percent aqueous solution of the cyan dyestuff of formula (III) and 4.2 ml. of deionized water is then poured onto the dried layer at 40° C.

The material is allowed to solidify and dry as indicated above.

A strip cut to 3.5×18 cm. is exposed under a step wedge through a Kodak 2b+49 blue filter with 50 Lux/cm.² for 10 seconds.

The procedure described in example 1 is then followed, but instead of the color bleaching catalyst of formula (27) a color bleaching catalyst of the formula

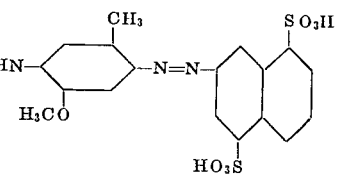

(30) 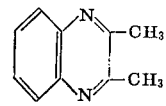

is used. A brilliant, very light-fast blue-green wedge is obtained which is completely bleached white in the position of the originally greatest silver density.

Similar results are obtained when another dyestuff of tables I, II and III is used instead of the dyestuff of formula (III).

EXAMPLE 4

A test strip manufactured and exposed in accordance with example 1 using the cyan dyestuff of formula (I) is processed in accordance with the following method:

1. five minutes development in a bath which contains per liter 1 g. of p-methylaminophenol sulphate, 20 g. of anhydrous sodium sulphite, 4 g. of hydroquinone, 10 g. of anhydrous sodium carbonate, 2 g. of potassium bromide and 3 g. of sodium thiocyanate;
2. two minutes washing;
3. two minutes treatment in a reversal bath which contains per liter 5 g. of potassium bichromate and 5 ml. of 96 percent sulphuric acid;
4. Four minutes washing;
5. five minutes treatment in a bath which contains 50 g. of anhydrous sodium sulphite per liter;
6. three minutes washing;
7. four minutes development in a bath which contains per liter 2 g. of 1-phenyl-3-pyrazolidone, 50 g. of anhydrous sodium sulphite, 10 g. of hydroquinone, 50 g. of anhydrous sodium carbonate, 2 g. of sodium hexametaphosphate and 20 ml. of a 1 percent aqueous solution of tert.-butylaminoborane;
8. two minutes washing;
9. further treatment as indicated in example 1 under 4 to 9.

A brilliant, highly light-fast blue-green wedge running counter to the primary original is obtained.

Similar results are obtained when using one of the other dyestuffs of tables I to III.

What is claimed is:

1. A photographic light-sensitive silver halide emulsion material which contains on a support at least one layer of having a dyestuff of the formula

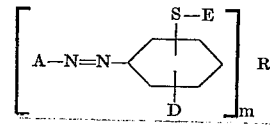

in which A denotes a hydroxynaphthalene radical which is unsubstituted or substituted by an amino or hydroxyl group which is unsubstituted or further substituted, and which contains at least one sulfonic acid or sulfonic acid amide group, the hydroxyl group being in ortho-position to the azo group, D denotes a hydrogen or halogen atom, a lower alkyl, a lower alkoxy or a lower hydroxyalkoxy group or an acylamino group, E denotes a lower alkyl, hydroxyalkyl or carboxyalkyl group, R denotes an organic radical which is bound to the benzene radical through a —NH— or —N=N— bridge, and $m$ denotes an integer having a value of at most 3, the dyestuff containing at least two sulfonic acid groups in the molecule.

2. Photographic material as claimed in claim 1, that contains a dyestuff of the formula

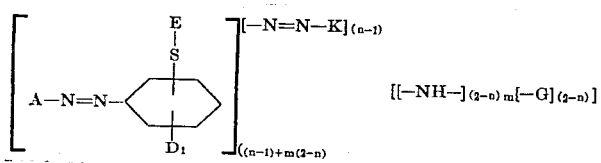

in which K denotes an aromatic or heterocyclic radical having at most three ring members, G denotes an acyl radical bound through $m$ acyl groups to $m$ —NH— groups, $n=1$ or 2, and A, D, E and $m$ have the significance indicated in claim 1, the dyestuff containing at least two sulfonic acid groups in the molecule.

3. Photographic material as claimed in claim 1, that contains a dyestuff of the formula

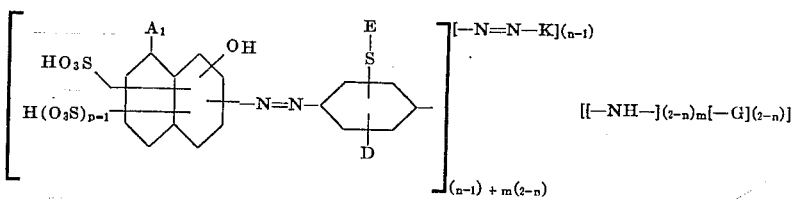

in which $A_1$ denotes a hydrogen atom or an amino or hydroxyl group which is unsubstituted or further substituted, $p=1$ or 2, and E, D, G, K, $m$ and $n$ have the significance indicated in claims 1 and 2, the hydroxyl group being in the 1- or 2-position, $A_1$ in the 8-position of the napthalene radical and the azo group in the ortho-position to the hydroxyl group, the dyestuff containing at least two sulfonic acid groups in the molecule.

4. Photographic material as claimed in claim 1 that contains a dyestuff of the formula

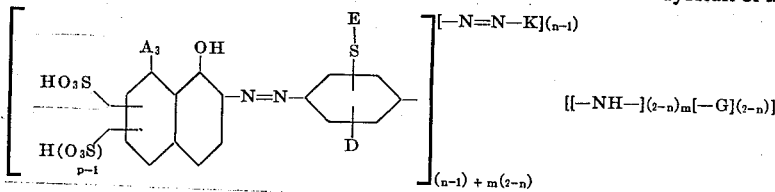

in which $A_3$ denotes a radical of the formula

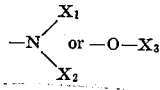

in which $X_1$ represents a hydrogen atom or a methyl or ethyl group, $X_2$ represents a hydrogen atom or a methyl, ethyl or cyclohexyl group, a phenyl group which is unsubstituted or further substituted or an acyl group, the acyl group being derived from an organic mono- or poly-carboxylic or -sulfonic acid or from a N-heterocyclic compound containing a hydrocyl group and possessing acid characteristics, $X_3$ represents a hydrogen atom or a methyl, ethyl, hydroxyethyl or benzyl group, and E, D, G, K, $m$, $n$ and $p$ have the significance indicated in claims 1 and 2, the dyestuff containing at least two sulfonic acid groups in the molecule.

5. Photographic material as claimed in claim 1 that contains a dyestuff of the formula

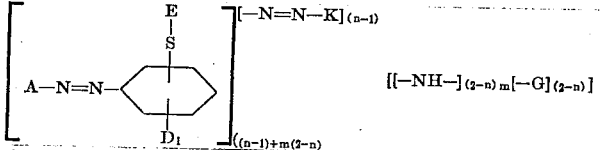

in which $D_1$ denotes a hydrogen or chlorine atom or a methyl, methoxy, ethoxy, hydroxyethoxy or acetylamino group and A, E, G, K, $m$ and $n$ have the significance indicated in claims 1 and 3, the dyestuff containing at least two sulfonic acid groups in the molecule.

6. Photographic material as claimed in claim 1, that contains a dyestuff of the formula

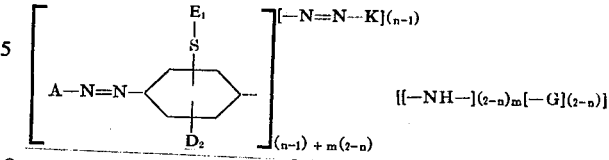

in which $E_1$ represents a methyl, ethyl or hydroxyethyl radical, $D_2$ denotes a hydrogen atom or a methyl or methoxy group, and the radicals $D_2$ and $E_1$—S— are in the paraposition to one another and A, G, K, $m$ and $n$ have the significance indicated in claims 1 and 2, the dyestuff containing at least two sulfonic acid groups in the molecule.

7. Photographic material as claimed in claim 1, that contains a dyestuff of the formula

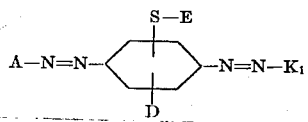

in which $K_1$ is a benzene, naphthalene or pyrazolone radical which is unsubstituted or further substituted, and A, E and D have the significance indicated in claim 1, the dyestuff containing at least two sulfonic acid groups in the molecule.

8. Photographic material as claimed in claim 1 that contains a dyestuff of the formula

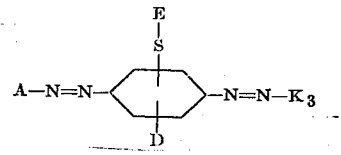

in which $K_3$ denotes a naphthol radical which is unsubstituted or substituted by a hydroxyl, alkoxy, hydroxyalkoxy, aralkoxy, amino, monoalkylamino or dialkylamino group in which each alkyl group contains at most five carbon atoms, a cyclohexylamino, phenylamino, carboxylic acid, carboxylic acid amide, sulfonic acid, sulfonic acid amide or acylamino group, the acyl radical being derived from an aliphatic or aromatic mono- or poly-carboxylic or -sulfonic acid, and A, D and E have the significance indicated in claim 1, the dyestuff containing at least two sulfonic acid groups in the molecule.

9. Photographic material as claimed in claim 1 that contains a dyestuff of the formula

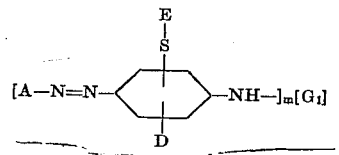

wherein $G_1$ denotes an acyl radical, bound through $m$ acyl groups to $m$ —NH— groups, of a substituted or unsubstituted aliphatic, monocarboxylic or dicarboxylic or monosulfonic acid, substituted or unsubstituted aromatic mono- or dicarboxylic or -sulfonic acid, a heterocyclic monocarboxylic or dicarboxylic acid or substituted or unsubstituted N-heterocyclic compound containing a hydroxyl group possessing acid characteristics, and A, D, E and $m$ have the significance indicated in claim 1, the dyestuff containing at least two sulfonic acid groups in the molecule.

10. Photographic material as claimed in claim 1 that contains a dyestuff of the formula

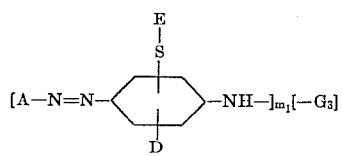

in which $G_3$ denotes an acyl radical, bound through $m_1$ acyl groups to $m_1$ —NH— groups, of an aliphatic monocarboxylic acid, a substituted or unsubstituted benzene monocarboxylic acid, an aliphatic dicarboxylic acid having at most eight carbon atoms, including carbonic acid, a substituted or unsubstituted benzenethiophene, furane or pyridine dicarboxylic acid or an aromatic dicarboxylic acid of the formula HOOC—Ph—M—Ph'—COOH in which Ph and Ph' each represents a substituted or unsubstituted phenylene radical and M represents an oxygen or sulfur atom or a —$SO_2$—, —$CH_2$—, —CO— or —HN—CO—NH— group, $m_1=1$ or 2, and A, D and E have the significance indicated in claim 1, the dyestuff containing at least two sulfonic acid groups in the molecule.

11. Photographic material as claimed in claim 1 that contains a dyestuff of the formula

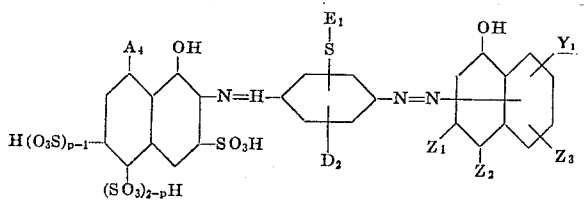

in which $A_4$ denotes a radical of the formula

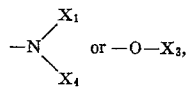

in which $X_1$ and $X_3$ have the significance indicated in claim 4, and $X_4$ denotes a hydrogen atom, a methyl, ethyl or cyclohexyl group, a phenyl group which may be further substituted or an acyl group, the acyl group being derived from an aliphatic, cycloaliphatic or araliphatic monocarboxylic or dicarboxylic acid having at most 10 carbon atoms, an aromatic mono- or di-carboxylic or -sulfonic acid, a heterocyclic mono- or di-carboxylic or a N-heterocyclic compound containing a hydroxyl group and possessing acid characteristics, $Z_1$, $Z_2$ and $Z_3$ each denotes a hydrogen atom or a sulfonic acid or sulfonic acid amide group, $Y_1$ denotes a hydrogen atom or a hydroxyl, alkoxy, hydroxyalkoxy, aralkoxy or alkylamino group, the alkyl radical in each case containing at most five carbon atoms, or an amino, cyclohexylamino, phenylamino or acylamino group, the acyl radical having the significance indicated in claim 8, and $p$, $E_1$ and $D_2$, have the significance indicated in claims 3 and 6, the right-hand side azo group being in the 2- 5- or 8-position of the 1-naphthol radical, the dyestuff containing at least two sulfonic acid groups in the molecule.

12. Photographic material as claimed in claims 8, 11 and 16, that contains at least one dyestuff of the formula

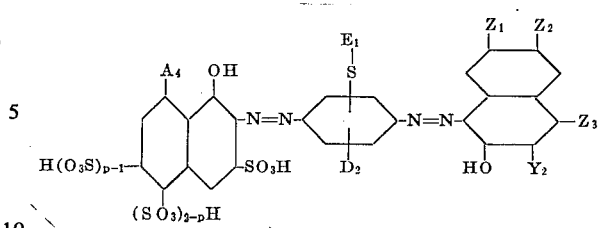

in which $Y_2$ is a hydrogen atom or a carboxylic acid or carboxylic acid amide group, and $A_4$, $p$, $E_1$, $D_2$, $Z_1$ $Z_2$ and $Z_3$ have the significance indicated in claims 3, 6 and 11, the dyestuff containing at least two sulfonic acid groups in the molecule.

13. Photographic material as claimed in claim 1, that contains a dyestuff of the formula

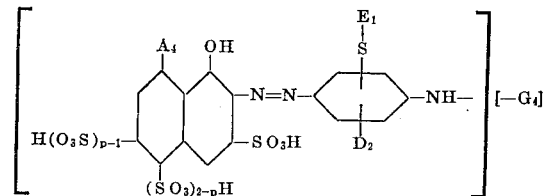

wherein $G_4$ denotes an acyl radical bound through $m_1$ acyl groups to $m_1$ —NH— groups and, when $m_1=1$, a monoacyl radical of an aliphatic monocarboxylic acid having at most five carbon atoms or of a substituted or unsubstituted benzene monocarboxylic acid, and, when $m_1=2$, a diacyl radical of glutaric, fumaric, terephthalic, isophthalic, thiophene-2,5dicarboxylic or pyridine-2,6dicarboxylic acid or a radical of the formula —CO— or —OC—p—$C_6H_4$—NH—CO—NH—p—$C_6H_4$—CO—, and $A_4$, $p$, $E_1$, $D_2$ and $m_1$ have the significance indicated in claims 3, 6, 10 and 11, the dyestuff containing at least two sulfonic acid groups in the molecule.

14. Photographic material as claimed in claim 1, that contains the dyestuff of the formula

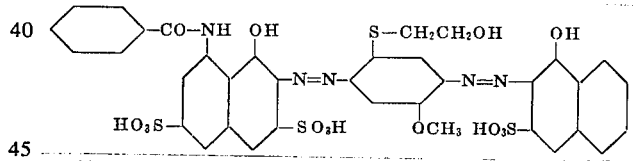

15. Photographic material as claimed in claim 1, that contains, the dyestuff of the formula

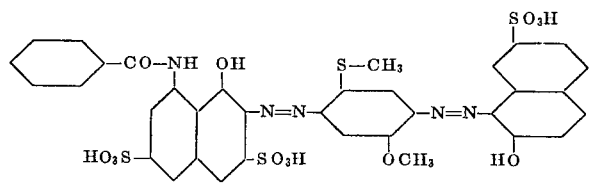

16. Photographic material as claimed in claim 1, that contains the dyestuff of the formula

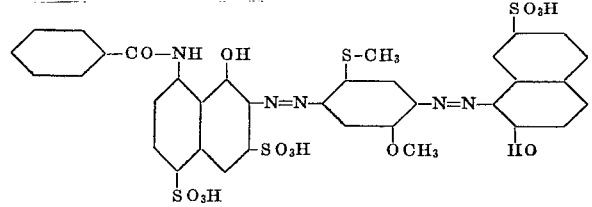

UNITED STATES PATENT OFFICE
CERTIFICATE OF CORRECTION

Patent No. 3,634,091          Dated January 11, 1972

Inventor(s) HANSROLF LOEFFEL ET AL

It is certified that error appears in the above-identified patent and that said Letters Patent are hereby corrected as shown below:

Column 23, claim 2, in the formula change "$D_1$" to read --- D ---.

Column 22, Claim 1, line 2, delete "of".

Column 25, line 53, after "boxylic" insert --- acid ---.

Signed and sealed this 4th day of July 1972.

(SEAL)
Attest:

EDWARD M. FLETCHER, JR.
Attesting Officer

ROBERT GOTTSCHALK
Commissioner of Patents